(12) United States Patent
Scobey et al.

(10) Patent No.: US 7,826,055 B2
(45) Date of Patent: Nov. 2, 2010

(54) OPTICAL CHANNEL ANALYZER WITH VARIABLE FILTER

(75) Inventors: Mike Scobey, Santa Rosa, CA (US); Robert Keys, Stittsville (CA); Rad Sommer, Sebastopol, CA (US)

(73) Assignee: Oclaro Technology Limited, Northamptonshire (GB)

( * ) Notice: Subject to any disclaimer, the term of this patent is extended or adjusted under 35 U.S.C. 154(b) by 741 days.

(21) Appl. No.: 11/716,238

(22) Filed: Mar. 9, 2007

(65) Prior Publication Data

US 2007/0222994 A1 Sep. 27, 2007

Related U.S. Application Data

(60) Provisional application No. 60/780,940, filed on Mar. 9, 2006.

(51) Int. Cl.
*G01N 21/25* (2006.01)

(52) U.S. Cl. .................................. 356/418; 356/419

(58) Field of Classification Search .............. 356/418; 359/889, 892; 398/9
See application file for complete search history.

(56) References Cited

U.S. PATENT DOCUMENTS

| | | | |
|---|---|---|---|
| 4,957,370 A * | 9/1990 | Tominaga et al. | 356/632 |
| 5,386,295 A * | 1/1995 | Switalski et al. | 356/418 |
| 6,049,411 A | 4/2000 | Sandhu et al. | |
| 6,094,446 A | 7/2000 | Tei et al. | |
| 6,122,301 A | 9/2000 | Tei et al. | |
| 6,144,025 A | 11/2000 | Tei et al. | |
| 6,292,616 B1 | 9/2001 | Tei et al. | |
| 6,371,662 B1 * | 4/2002 | Leard et al. | 385/88 |
| 6,442,324 B2 | 8/2002 | Tei et al. | |
| 6,765,189 B1 | 7/2004 | Sahu et al. | |
| 6,816,643 B2 | 11/2004 | Tei | |
| 7,006,765 B2 | 2/2006 | Hendow | |
| 7,099,358 B1 | 8/2006 | Chong | |
| 7,120,361 B2 | 10/2006 | Tei | |
| 7,199,927 B2 | 4/2007 | Uehara | |
| 7,199,928 B2 | 4/2007 | Uehara | |
| 2002/0001447 A1 | 1/2002 | Tei et al. | |
| 2002/0171834 A1 * | 11/2002 | Rowe et al. | 356/418 |
| 2005/0201432 A1 | 9/2005 | Uehara et al. | |
| 2005/0219543 A1 | 10/2005 | Uehara et al. | |
| 2005/0261592 A1 * | 11/2005 | Suga | 600/478 |

\* cited by examiner

*Primary Examiner*—Kara E Geisel
(74) *Attorney, Agent, or Firm*—Roeder & Broder LLP

(57) ABSTRACT

An optical analyzer (14) for performing spectral analysis on an optical beam (18) includes an optical filter (28), a mover (30), an optical launcher (36), and an optical receiver (38). The optical filter (28) includes a filter area (46) that is a narrow band pass type filter having multiple alternative center bandwidths that are distributed along the filter area (46). The mover (30) moves the optical filter (28). The first optical launcher (36) directs the optical beam (18) at the filter area (46) so that the optical beam (18) is near normal incidence to the filter area (46). The optical analyzer (14) can be used to simultaneously monitor multiple optical signals. Additionally, the optical analyzer (14) can include a beam redirector (40) that causes the optical beam (18) to make two passes through the optical filter (28).

39 Claims, 9 Drawing Sheets

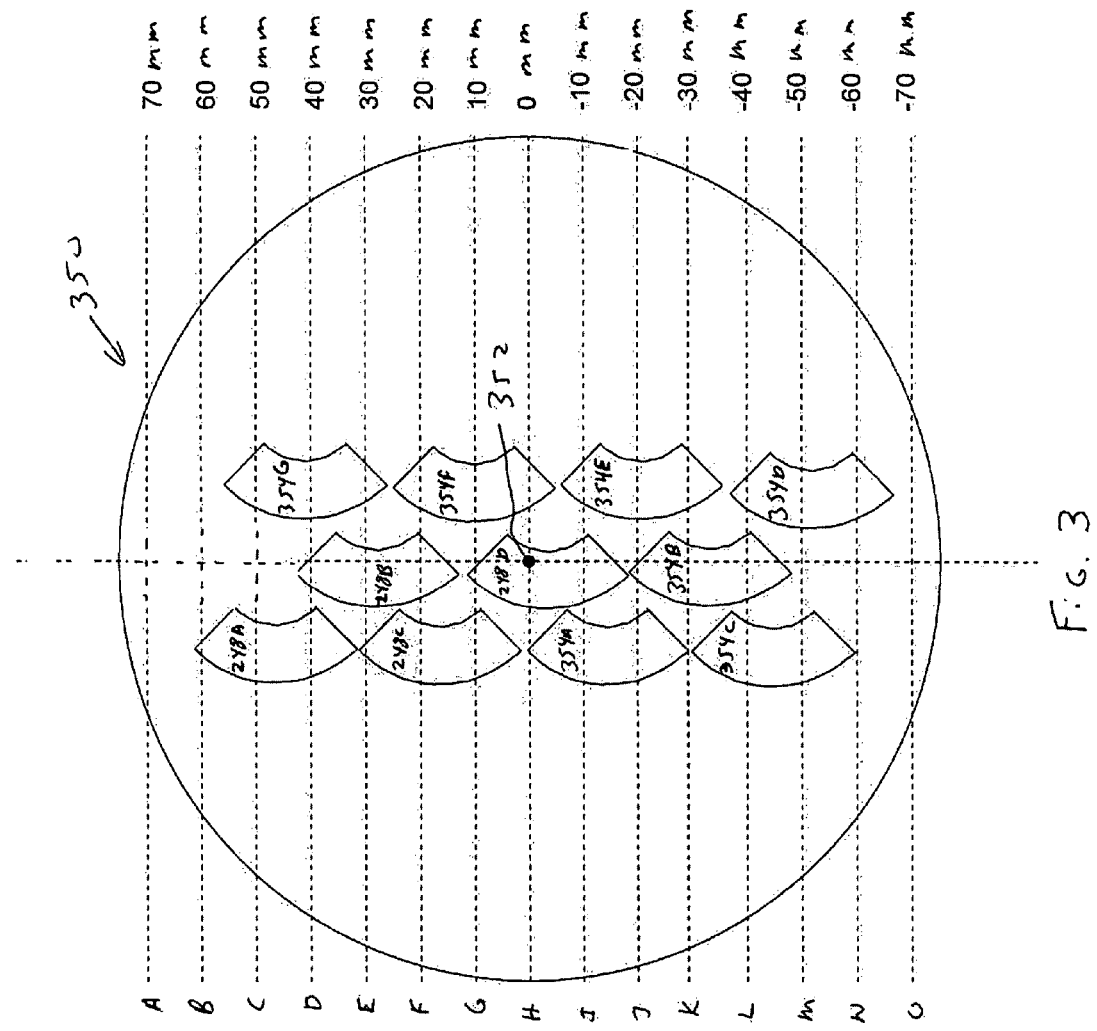

OPTICAL CHANNEL ANALYZER WITH VARIABLE FILTER

REFERENCE TO RELATED APPLICATION

This Application claims the benefit on U.S. Provisional Application Ser. No. 60/780,940 filed on Mar. 9, 2006. The contents of U.S. Provisional Application Ser. No. 60/780,940 are incorporated herein by reference.

BACKGROUND

Communication networks include one or more optical fibers that carry one or more optical signals. It is often very important to monitor the optical signals to determine the wavelengths of the optical signals and/or the power of the optical signals. With this information, the communication network can be adjusted to improve the performance.

In addition, monitoring optical signals to determine the wavelength(s) of the optical signals is key in the context of spectroscopy. In general, spectroscopy involves analyzing the wavelength(s) of different types of visible and invisible light to detect the molecular content or structural information of a substance being analyzed, or for other suitable purposes known to those skilled in the art. Various types of spectroscopy include absorption spectroscopy (i.e. ultraviolet, visible and/or infrared spectroscopy), emission spectroscopy (i.e. fluorescence spectroscopy) and scattering spectroscopy (i.e. Raman spectroscopy), as non-exclusive examples.

Unfortunately, existing means for monitoring optical signals are relatively expensive to manufacture, relatively large in size, difficult to operate, sensitive to temperature changes, and/or not very accurate. Further, existing methods for monitoring optical signals cannot be easily expanded to monitor multiple channels.

SUMMARY

The present invention is directed to an analyzer for performing spectral analysis on a first optical beam. The analyzer includes an optical filter, a mover, and an optical launcher assembly. The optical filter includes a first filter area. The mover moves the optical filter. The optical launcher assembly directs a portion of the first optical beam at the first filter area so that the first optical beam is near normal incidence to the first filter area. With this design, the analyzer is relatively simple and inexpensive to manufacture, reliable, relatively insensitive to temperature changes, and accurate.

In one embodiment, the mover rotates the optical filter about a filter rotational axis and the optical launcher assembly directs the first optical beam at the first filter area so that the first optical beam is substantially parallel to the filter rotational axis.

Additionally, the optical launcher assembly can direct a second optical beam at the first filter area with the second optical beam at near normal incidence to the first filter area and spaced apart from the first optical beam. In one embodiment, the first optical beam and the second optical beam are carrying the same optical signals. For example, a fiber coupler can be used to split an optical fiber into a first fiber and a second fiber, and divide the optical signals. With this design, the optical launcher assembly can direct two spaced apart optical beams at the first filter area. Alternatively, the launcher assembly can include a beam splitter that causes two or more spaced apart optical beams to be directed at the optical filter. With this design, the simultaneous analysis of the same optical signals can be used to deconvolve multiple input signals.

Alternatively, the first optical beam and the second optical beam can be carrying different optical signals. With this design, the optical analyzer can be used to simultaneously monitor multiple different optical signals.

In another embodiment, the optical filter can include a second filter area. In this embodiment, the optical launcher assembly can direct a portion of the first optical beam or a portion of the second optical beam at the second filter area. This design can allow for the testing of different ranges of optical signals with the same optical filter.

In one embodiment, the filter area is a band pass type filter that includes multiple, alternative center wavelengths that are distributed along the filter area. For example, the filter area can be a narrow band pass filter having a center wavelength value that varies along the filter area. By exploiting the variation in the center wavelengths with movement of the optical filter, both the wavelength and the power level of the optical beam can be accurately monitored.

Additionally, the optical analyzer can include an optical redirector that causes a portion of the first optical beam to make two passes through the same optical filter. This improves discrimination for the optical analyzer.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 3 is a plan view of a wafer that can be used to make the optical filter of FIG. 2;

DESCRIPTION

Figure 1:
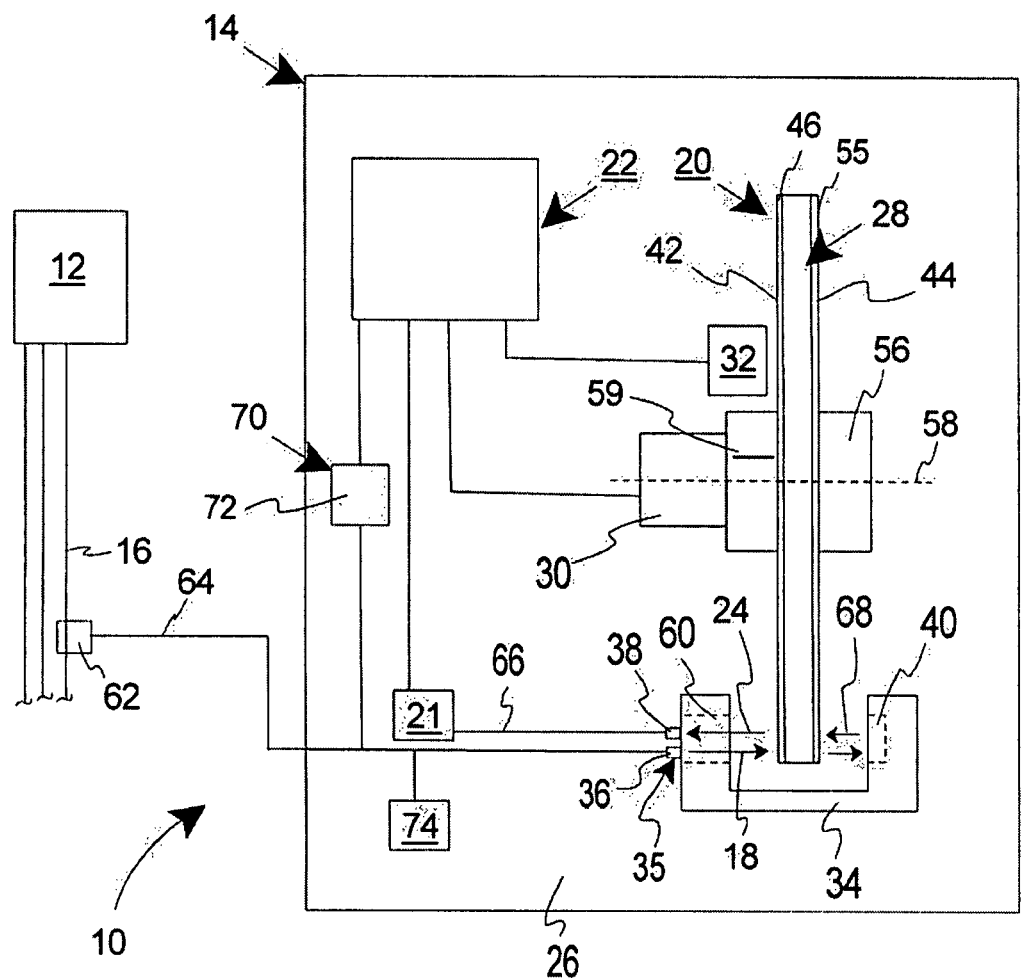
FIG. 1 is a simplified illustration of a precision apparatus having features of the present invention.

Referring initially to FIG. 1, the present invention is directed to a precision apparatus 10 that, for example, can be used as or in optical communications, technical instruments or scientific instruments. FIG. 1 is a simplified view of one non-exclusive embodiment of the precision apparatus 10. In this embodiment, the precision apparatus 10 includes an optical network 12 (only a portion is illustrated in FIG. 1) and an optical analyzer 14. The design and orientation of the components of the precision apparatus 10 can be changed to suit the requirements of the precision apparatus 10.

As an overview, in certain embodiments, the optical analyzer 14 provides a relatively simple, low cost, relatively compact, and highly reliable device for performing spectral analysis and/or monitoring of the optical network 12 or a portion thereof. Further, in certain embodiments, the optical analyzer 14 can be used to alternatively or simultaneously monitor multiple optical signals.

The optical network 12 includes one or more optical fibers 16, that each carries one or more optical signals. As provided herein, for each optical fiber 16, an optical beam 18 can be analyzed that includes the multiple optical signals. In FIG. 1, the optical network 12 includes three optical fibers 16. However, the optical network 12 could be designed with more than three or less than three optical fibers 16. Additionally, the optical network 12 can include multiple other components that are not shown in FIG. 1. For example, the optical network 12 can include one or more lasers, receivers, and amplifiers.

The optical analyzer 14 performs spectral analysis on one or more of the optical beams 18. In one embodiment, the spectral analysis can include determining the wavelength and power level of the one or more optical signals. With this information, the operation and performance of the precision apparatus 10 can be adjusted. In FIG. 1, the optical analyzer 14 determines the wavelength and power level of one or more optical signals in the optical beam 18. Alternatively, for example, the optical analyzer 14 could be used to only determine the wavelength of the optical signals.

In one embodiment, the optical analyzer 14 is a channel monitor that is designed to perform spectral analysis on the communication bands. Typically, communication bands are at frequencies of between approximately 1526 and 1575 nanometers. Alternatively, for example, the analyzer 14 could be designed to perform spectral analysis on beams 18 that are at wavelengths that are greater than or lesser than the communication bands. For example, the optical analyzer 14 can be designed to perform spectral analysis on the L bands that are at frequencies of between approximately 1571 and 1610 nanometers.

The design of the optical analyzer 14 can vary pursuant to the teachings provided herein. In FIG. 1, the optical analyzer 14 includes a filter assembly 20, a beam detector 21, and a control system 22.

The filter assembly 20 transmits or blocks a portion of the spectrum of the optical beam 18 that is directed at the filter assembly 20. If the spectrum is narrow spectral source such as a laser, then the filter will either transmit or block the beam. The portion of the optical beam 18 that passes through the filter assembly 20 is referred to herein as the transmitted optical beam 24. The transmitted optical beam 24 is subsequently transferred to the beam detector 21.

The design of the filter assembly 20 can vary pursuant to the teachings provided herein. In the embodiment illustrated in FIG. 1, the filter assembly 20 includes a filter base 26, an optical filter 28, a mover 30, an position sensor 32, a bracket 34, a beam launcher assembly 35 including a optical launcher 36, a beam receiver 38, and a beam redirector 40. In this embodiment, optical analyzer 14 is a two pass system, with the transmitted optical beam 24 having passed twice through the optical filter 28. This can improve the discrimination and accuracy.

Alternatively, for example, the filter assembly 20 could be designed without one or more of these components. For example, the filter assembly 20 could be designed without the beam redirector 40. In this embodiment, the optical analyzer 14 can be a single pass system, with the transmitted optical beam 24 passing only once through the optical filter 28.

Still alternatively, the filter assembly 20 could be designed with a plurality of beam redirectors 40 that cause the optical beam 18 to pass more than two times through the optical filter 28.

The filter base 26 supports the other components of the filter assembly 20. In one embodiment, the filter base 26 is a rigid plate. Alternatively, the filter base 26 could have another configuration.

The optical filter 28 filters the optical beam 18. In one embodiment, the optical filter 28 is generally disk shaped and includes a first filter side 42 that faces the optical launcher 36 and an opposed second filter side 44 that faces the optical redirector 40. In one embodiment, the first filter side 42 includes a filter area 46 that is a band pass type filter that transmits a band of wavelengths ("the passband") and blocks wavelengths outside of the passband. The passband has a center wavelength that is at that the center of the passband. In one embodiment, the filter area 46 has multiple different center wavelengths that are spread along the filter area 46. Further, in alternative non-exclusive embodiments, the filter is a narrow band pass filter with a passband having a bandwidth of less than approximately 0.1, 0.2, 0.5, 1, or 5 nanometers For each center wavelength, the transition from transmitting to rejection can be gradual ("wide band pass filter") or sharp ("narrow band pass filter"). In certain embodiments, the filter area 46 is a narrow band pass interference type filter.

In another embodiment, the filter area 46 is an edge filter with relatively steep spectral slopes. In alternative, non-exclusive embodiments, the edge filter has a spectral slope capable of transitioning between 10% and 90% transmission in less than 0.2 nm, 0.5 nm, 1 nm, or 5 nm.

As used herein, in alternative embodiments, the term "steep spectral slope" shall mean a spectral slope capable of transitioning between 10% and 90% transmission in less than 0.2 nm, 0.5 nm, 1 nm, or 5 nm.

Figure 2:
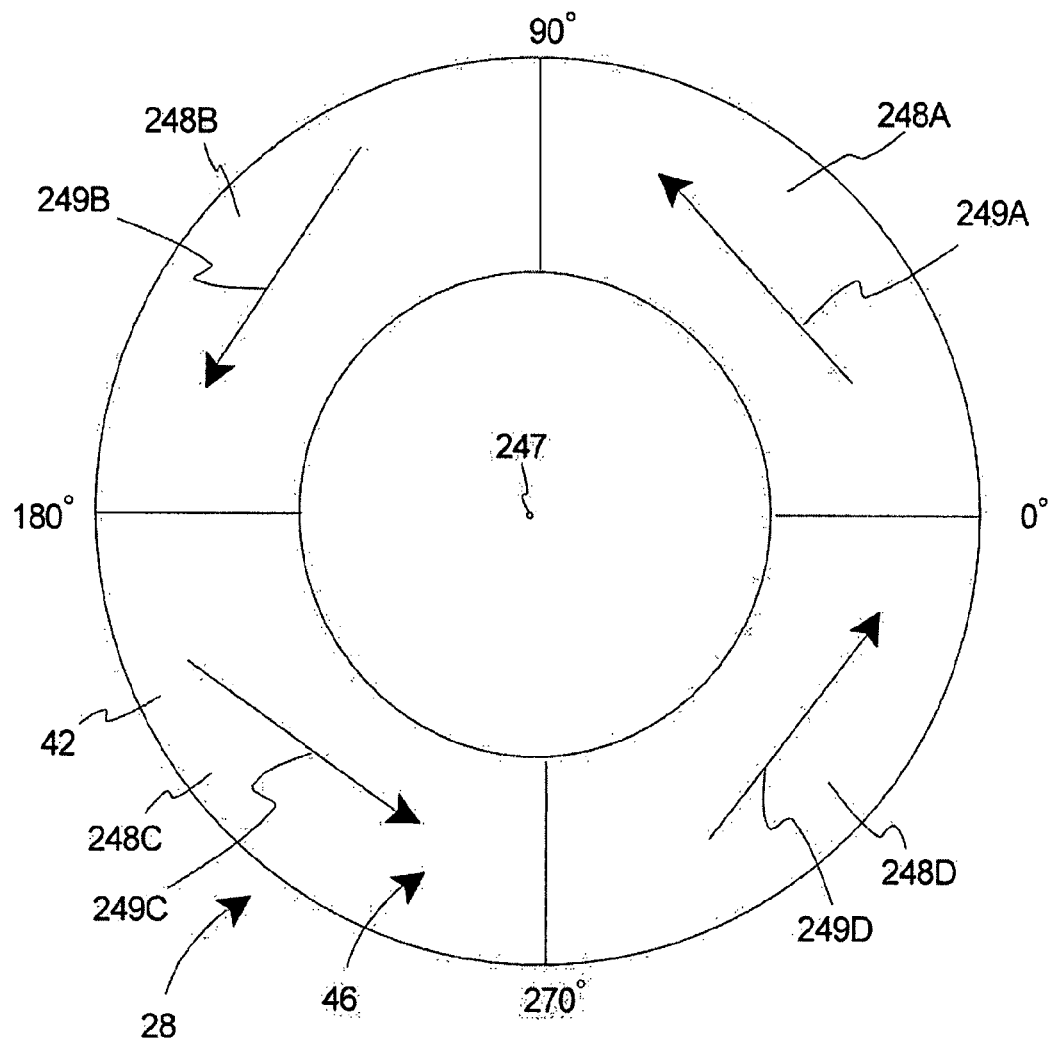
FIG. 2 is a plan view of an optical filter having features of the present invention.

FIG. 2 illustrates a plan view of the first filter side 42 of one embodiment of the optical filter 28. In this embodiment, the filter area 46 is generally annular disk shaped. Alternatively, the filter area 46 could have another shape.

Additionally, in this embodiment, the value of the center wavelength varies continuously along the filter area 46. Stated in another fashion, the value of the center wavelength varies around the circumference of the filter area 46. For example, in the embodiment illustrated in FIG. 2, (i) at the radial position that corresponds to 0 degrees, the filter area 46 transmits the center wavelength of approximately 1500 nm and rejects wavelengths outside the center wavelength 1500 nm; (ii) at the radial position that corresponds to 90 degrees, the filter area 46 transmits the center wavelength of approximately 1525 nm and rejects wavelengths outside the center wavelength 1525 nm; (iii) at the radial position that corresponds to 180 degrees, the filter area 46 transmits the center wavelength of approximately 1550 nm and rejects wavelengths outside the center wavelength 1550 nm; and (iv) at the radial position that corresponds to 270 degrees, the filter area 46 transmits the center wavelength of approximately 1575 nm and rejects wavelengths outside the center wavelength 1575 nm.

Alternatively, the center wavelength value that corresponds to 0, 90, 180, 270 degrees can have other values.

It should be noted that (i) for the radial positions between 0 and 90 degrees, the center wavelength can vary substantially linearly or non-linearly; (ii) for the radial positions between 90 to 180 degrees, the center wavelength can vary substantially linearly or non-linearly; (iii) for the radial positions between 180 to 270 degrees, the center wavelength can vary substantially linearly or non-linearly; and (iv) for the radial positions between 270 to 0 degrees, the center wavelength can vary substantially linearly or non-linearly.

In alternative, non-exclusive embodiments, the filter area 46 can be made so that for every degree (e.g. radial position) from 0 and 359 degrees, the center wavelength varies (e.g. increases or decreases) approximately 0.01, 0.05, 0.1, 0.2, 0.5, 1, or 2 nanometers. However, other values can be used.

The method used for making the optical filter 28 can vary. In one embodiment, the optical filter 28 is a circular variable interference filter in which the center wavelength varies relatively linearly.

In another embodiment, the filter area 46 is made of four separate arch shaped segments, including a first filter segment 248A, a second filter segment 248B, a third filter segment 248C, and a fourth filter segment 248D that are secured together to form the annular disk shaped filter area 46. Alternatively, for example, the filter area 46 could be made with more than four or less than four filter segments 248A-248D. These filter segments 248A-248D can be secured to a transparent disk (not shown) or a hub (not shown).

One method for making the filter segments 248A-248D is described below. It should be noted that other methods for making the variable center wavelength optical filter 28 can be utilized.

It should also be noted that the optical filter 28 can have another configuration other than a disk shape. For example, the optical filter 28 could include one or more linear filters.

FIG. 3 is a simplified top view of a wafer 350 that can be used to make one or more of the filter segments 248A-248D. In this embodiment, the wafer 350 is a substrate that has been coated with filter material so that the value of the center wavelength varies along the wafer 350. For ease of discussion, in FIG. 3, the right column is a reference system that outlines a plurality of positions on the wafer 350 relative to a reference point 352. In this example, the reference point 352 is at the center position of the wafer 350. Alternatively, for example, the reference point 352 can be located at the edge of the wafer 350. Further, in FIG. 3, the reference system is in increments of 10 mm. For example, reference line 10 corresponds to a line that is 10 mm away from the reference point 352, and reference line -10 corresponds to a line that is -10 mm away from the reference point 352.

The left column in FIG. 3 references the center wavelength of the wafer 350 at that particular location. In FIG. 3, the left column lists the different center wavelengths A-O. In this embodiment, for example, the wafer 350 has (i) a center wavelength that is equal to A at 70 mm from the reference point 352; (ii) a center wavelength of B at 60 mm from the reference point 352; (iii) a center wavelength of C at approximately 50 mm from the reference point 352; (iv) a center wavelength of D at 40 mm from the reference point 352; (v) a center wavelength of E at 30 mm from the reference point 352; (vi) a center wavelength of F at 20 mm from the reference point 352; (vii) a center wavelength of G at 10 mm from the reference point 352; (viii) a center wavelength of H at the reference point 352; (ix) a center wavelength of I at -10 mm from the reference point 352; (x) a center wavelength of J at -20 mm from the reference point 352; (xi) a center wavelength of K at -30 mm from the reference point 352; (xii) a center wavelength of L at -40 mm from the reference point 352; (xiii) a center wavelength of M at -50 mm from the reference point 352; (xiv) a center wavelength of N at -60 mm from the reference point 352; and (xv) a center wavelength of O at -70 mm from the reference point 352.

The value of the center wavelength that corresponds to A-O can be varied to suit the optical beam 18 (illustrated in FIG. 1) being analyzed. In FIG. 3, the center wavelength varies from the top to the bottom of the wafer 350. Further, the center wavelength can vary substantially linearly or non-linearly from top to bottom.

In one non-exclusive embodiment, (i) center wavelength A has a value of approximately 1430 nanometer; (ii) center wavelength B has a value of approximately 1455 nanometer; (iii) center wavelength C has a value of approximately 1475 nanometer; (iv) center wavelength D has a value of approximately 1502 nanometer; (v) center wavelength E has a value of approximately 1523 nanometer; (vi) center wavelength F has a value of approximately 1541 nanometer; (vii) center wavelength G has a value of approximately 1555 nanometer; (viii) center wavelength H has a value of approximately 1564 nanometer; (ix) center wavelength I has a value of approximately 1572 nanometer; (x) center wavelength J has a value of approximately 1577 nanometer; (xi) center wavelength K has a value of approximately 1584 nanometer; (xii) center wavelength L has a value of approximately 1591 nanometer; (xiii) center wavelength M has a value of approximately 1598 nanometer; (xiv) center wavelength N has a value of approximately 1604 nanometer; and (xv) center wavelength O has a value of approximately 1625 nanometer.

In another non-exclusive embodiment, (i) center wavelength A has a value of approximately 1500 nanometer; (ii) center wavelength B has a value of approximately 1510 nanometer; (iii) center wavelength C has a value of approximately 1520 nanometer; (iv) center wavelength D has a value of approximately 1530 nanometer; (v) center wavelength E has a value of approximately 1540 nanometer; (vi) center wavelength F has a value of approximately 1550 nanometer; (vii) center wavelength G has a value of approximately 1560 nanometer; (viii) center wavelength H has a value of approximately 1570 nanometer; (ix) center wavelength I has a value of approximately 1580 nanometer; (x) center wavelength J has a value of approximately 1590 nanometer; (xi) center wavelength K has a value of approximately 1600 nanometer; (xii) center wavelength L has a value of approximately 1610 nanometer; (xiii) center wavelength M has a value of approximately 1620 nanometer; (xiv) center wavelength N has a value of approximately 1630 nanometer; and (xv) center wavelength O has a value of approximately 1640 nanometer.

However, other values for A-O can be utilized. Note that for this embodiment the wavelength of A overlaps multiple arch segments. This prevents gaps in spectral coverage of the analyzer.

In one embodiment, the wafer 350 includes an interference coating that is deposited on the substrate in a vacuum coating chamber (not shown). The coating can be made up of thin layers of dielectrics, resulting in high transmission over narrow spectral bands. In one embodiment, the chamber is designed to vary the center wavelength of the filter linearly across the wafer 350 in a controlled manner. In other embodiments a non-linear variation can be used. In particular a non-linear variation can be used which when translated to a circular motion provides a linear change in wavelength with angle.

The dense dielectric filter material can be deposited using a number of different methods including physical vapor deposition such as ion beam sputtering, magnetron sputtering, and ion assisted evaporation. One method for depositing a coating is disclosed in U.S. Pat. No. 6,736,943, the contents of which are incorporated herein by reference. During the manufacture of narrow band filters, laser monitoring at the center wavelength of the filter can be used for accurate thickness control. This can be useful for multiple cavity bandpass designs. The center wavelength gradient across the filter can be created and controlled by either physical masking of the depositing vapor or careful selection of the source location to provide the required uniformity.

Next, the arch shaped filter segments 248A-248D can be cut from the wafer 350 and assembled to form the filter area 46 (illustrated in FIG. 2) having the center wavelength that varies around the circumference of the filter area 46. In FIG. 3, the filter segments 248A-248D are slightly overlapping.

Because the edges of the filter segments 248A-248D overlap slightly, the assembled filter area 46 does not have a gap in the center wavelength at the intersection of the filter segments 248A-248D.

Alternatively, the filter segments 248A-248D can be cut from other regions of the wafer 350 to achieve the desired center wavelength distribution of the filter area 46.

It should be noted that FIG. 3 illustrates that the wafer 350 can include more than four filter segments 248A-248D. For example, FIG. 3 illustrates seven additional filter segments 354A-G. In this example, filter segments 354A-D can be used to make another optical filter (not shown).

Referring back to FIG. 2, after the filter segments 248A-248D are assembled, for each filter segment 248A-248D, the center wavelength varies substantially linearly along a line 249A-249D that is substantially tangential to a center axis 247 of the filter 28. More specifically, arrow 249A illustrates that the center wavelength increases linearly for filter segment 248A substantially tangential to the center axis 247, arrow 249B illustrates that the center wavelength increases linearly for filter segment 248B substantially tangential to the center axis 247, arrow 249C illustrates that the center wavelength increases linearly for filter segment 248C substantially tangential to the center axis 247, and arrow 249D illustrates that the center wavelength increases linearly for filter segment 248D substantially tangential to the center axis 24D.

Referring back to FIG. 1, in one embodiment, the second filter side 44 of the optical filter 28 can include an anti-reflection (AR) coating 55. In this embodiment, the anti-reflection (AR) coating 55 can be designed to eliminate reflection for wavelengths in the entire band that the optical analyzer 14 is analyzing.

Alternatively, for example, the second filter side 44 can tapered as described in below in the discussion of FIG. 5. However, for the two pass system illustrated in FIG. 1, if the second filter side 44 is tapered, the beam redirector 40 will have designed and positioned to compensate for the tapered second filter side 44.

The mover 30 causes relative movement between the optical beam 18 and the optical filter 28. For example, in one embodiment, the mover 30 moves the optical filter 28 relative to the optical beam 18. In FIG. 1, the mover 30 includes a mover spindle 56 that is coupled to the optical filter 28. In this embodiment, the mover 30 rotates the mover spindle 56 and the filter area 46 of the optical filter 28 about a filter rotational axis 58. In one embodiment, the mover 30 rotates the optical filter 28 at between approximately 1000-10000 rpm. However, the mover 30 can rotate the optical filter 28 at greater or lesser than these amounts.

For example, the mover 30 can be an air bearing type motor. A suitable air bearing motor is sold by Nidec Copal (U.S.A.) Corporation having an office in Torrance, Calif. Alternatively, for example, the mover 30 can be another type of motor, such as spindle motor. Still alternatively, for example, the mover 30 could be designed to move the optical filter 28 linearly or in another fashion.

The position sensor 32 monitors the position of the filter area 46 and monitors the movement speed of the filter area 46. In FIG. 1, the position sensor 32 monitors the rotational position of the filter area 46 and monitors the rotational speed of the filter area 46. In one non-exclusive embodiment, the position sensor 32 reads a timing mark 59 on the mover spindle 56 to determine the rotational position and the rotational speed of the filter area 46. Alternatively, for example, the position sensor 32 can be another type of sensor. In certain embodiments, the present invention does not require extremely accurate rotational position measurement. This allows the optical analyzer 14 to be made less expensively.

The bracket 34 retains the optical launcher 36, the optical receiver 38 and the beam redirector 40. In FIG. 1, the bracket 34 is a rigid, generally "U" shaped bracket. Alternatively, the bracket 34 could have another configuration.

The optical launcher 36 directs the optical beam 18 at the filter area 46 of the optical filter 28. Somewhat similarly, the optical receiver 38 receives the transmitted optical beam 24 that has passed through the filter area 46 of the optical filter 28. In one embodiment, the optical launcher 36 includes a fiber tip of an optical fiber, and the optical receiver 38 includes a fiber tip of an optical fiber.

In FIG. 1, the optical launcher 36 and the optical receiver 38 are slightly spaced apart to provide a small angle of the transmitted optical beam 24 to the optical filter 28. It should be noted that the distance between the optical launcher 36 and the optical receiver 38 is greatly exaggerated in FIG. 1 for ease of illustration.

In one embodiment, the optical launcher 36 collimates the optical beam 18 and the optical receiver 38 collimates the transmitted optical beam 24. In FIG. 1, the optical launcher 36 and optical receiver 38 include a single collimator 60 that collimates both the optical beam 18 and the transmitted optical beam 24. Alternatively, separate collimators can be utilized. Further, a discrete detector with out a collimator can be used as well.

With the present invention, the optical beam 18 is directed by the optical launcher 36 at near normal incidence to the filter area 46 and the rest of the optical filter 28. Stated in another fashion, the optical beam 18 is directed by the optical launcher 36 substantially parallel to the filter rotational axis 59. With this design, the optical analyzer 14 is relatively simple in that the optical beam 18 is near normally incidence and therefore does not suffer the disadvantages of working at variable or high angles such as polarization effects.

It should be noted that the optical analyzer 14 can include a tap 62 and a first connector fiber 64. The tap 62 allows for the optical beam 18 to be diverted from the optical network 12 and the first connector fiber 64 connects the tap 62 to the optical launcher 36. Further, the optical analyzer 14 can include a second connector fiber 66 that connects the optical receiver 38 to the beam detector 21.

The beam redirector 40 reflects a once transmitted optical beam 68 that passed through the optical filter 28 back at the optical filter 28. In FIG. 1, the beam redirector 40 is an optical mirror that is positioned on the opposite side of the optical filter 28 than the optical director 36.

The beam detector 21 measures when light energy is received by the beam detector 21. With this information, the optical analyzer 14 can detect that the optical beam 18 has been transmitted through the optical filter 28. In one embodiment, the beam detector 21 measures the power level of the transmitted optical beam 24. Suitable, non-exclusive examples of beam detectors 21 include a photodiode that measures the intensity of the transmitted optical beam 24.

The control system 22 is electrically connected to the electric components of the optical analyzer 14 and controls the operation of the electric components of the optical analyzer 14. Further, with information from the beam detector 21 regarding the magnitude of the transmitted optical beam 24, and with the corresponding information from the position sensor 32 regarding the position of the filter area 46, the control system 22 can determine the wavelength and power level of the optical beam 18. The control system 22 can include one or more processors that are capable of high volume processing.

Figure 4A:
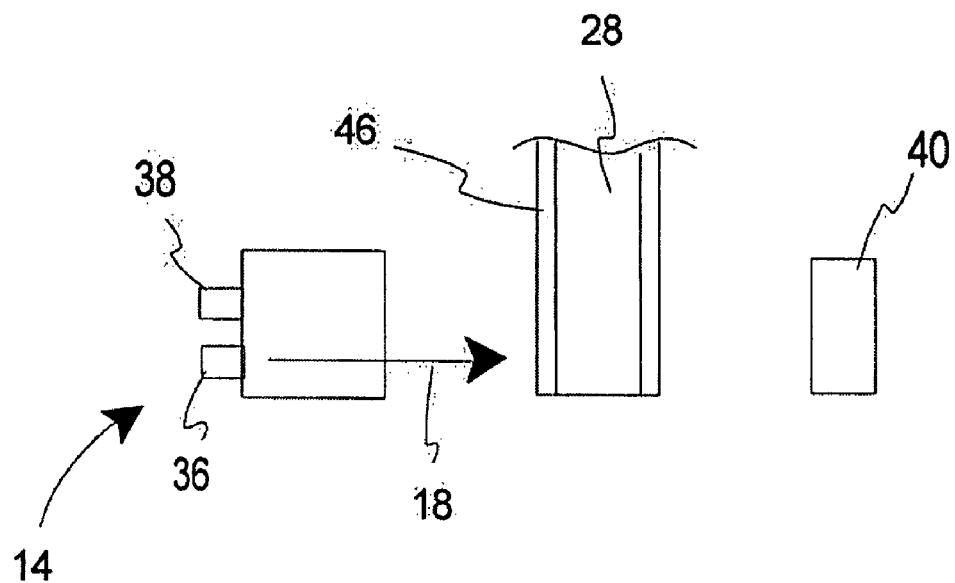
FIGS. 4A and 4B are alternative, simplified illustrations of a portion of the precision apparatus of FIG. 1.
Figure 4B:
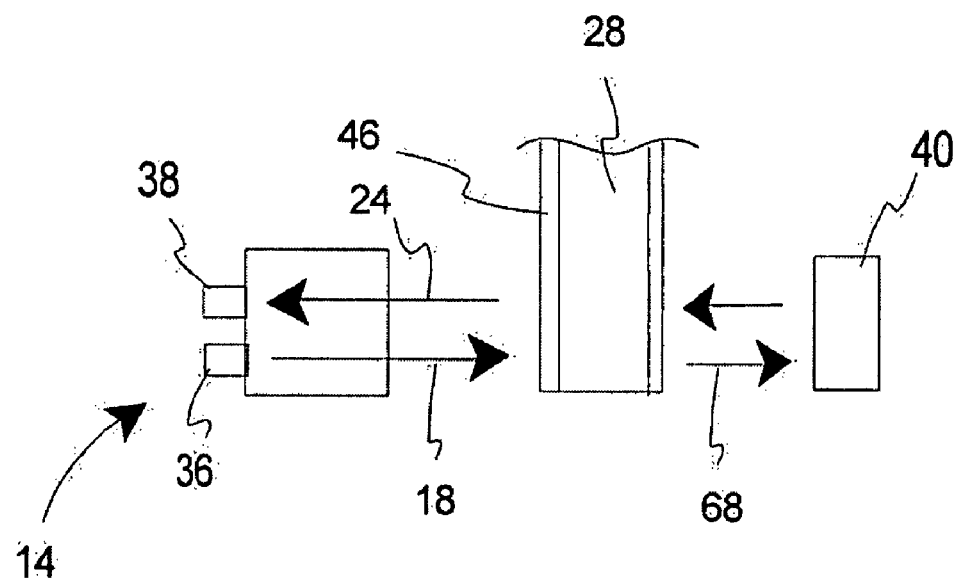

The operation of the optical analyzer 14 can better be understood with reference to FIGS. 4A and 4B that illustrate views of a portion of the optical analyzer 14 at two alternative times. FIGS. 4A and 4B illustrate a portion of the optical filter 28, the optical launcher 36, the optical receiver 38, and the beam redirector 40. During operation of the optical analyzer 14, the optical launcher 36 is continuously directing the optical beam 18 at the filter area 46. However, as illustrated in FIG. 4A, at a first moment in time, if the center wavelength of the region of the filter area 46 that is in the path of the optical beam 18 is significantly different than the wavelength of the optical beam 18, the filter area 46 blocks the optical beam 18 and does not transmit the optical beam 18. As a result thereof, there is no transmitted optical beam and the optical receiver 38 does not receive a transmitted optical beam. Further, the beam detector 21 (illustrated in FIG. 1) does not receive a transmitted optical beam.

As illustrated in FIG. 4B, at a second moment in time, the optical filter 28 has been moved to a position where the center wavelength of the region of the filter area 46 that is in the path of the optical beam 18 is the same as the wavelength of the optical beam 18. At this moment in time, the filter area 46 transmits the optical beam 18 and the once transmitted optical beam 68 is directed at the beam redirector 40. FIG. 4B illustrates that the beam redirector 40 has redirected the once transmitted optical beam 68 at the filter area 46 and the transmitted optical beam 24 is transmitted through the filter area 46 if the center wavelength of the region of the filter area 46 that is in the path of the once transmitted optical beam 68 is the same as the wavelength of the once transmitted optical beam 68.

Thus, during rotation of the filter area 46, the filter area 46 blocks the optical signal at all times, except for that moment in time in each rotation in which the particular region of the filter area 46 having a center wavelength that is approximately equal to the wavelength of the optical beam 18 is positioned in the path of the optical beam 18.

The transmitted optical beam 24 is subsequently transferred to the beam detector 21. With information from the beam detector 21 regarding the magnitude of the transmitted optical beam 24, and with the corresponding information from the position sensor 32 regarding the position of the filter area 46, the control system 22 can determine and monitor the wavelength and power level of the optical beam 18.

Referring back to FIG. 1, the optical analyzer 14 can also include a calibration system 70 that can be used to initially calibrate the optical analyzer 14. In one embodiment, the calibration system 70 includes a beam generator 72 that can be controlled by the control system 22 to selectively generate a plurality of alternative calibration optical beams (not shown), each having a different, known wavelength and each having a known power level. Further, in FIG. 1, the beam generator 72 transfers the calibration optical beams to the optical launcher 36. With the known wavelength and power level of the calibration optical beam being directed at the optical filter 28, the position of each of the center wavelengths of the filter area 46 can be calibrated.

For example, the beam generator 72 can generate a first calibration optical beam having a first wavelength and a first power level. When the calibration optical beam is transmitted through the filter area 46 (as measured by the beam detector 21), the position of center wavelength having a value of the first wavelength for the filter area 46 can be determined. Further, the power level of the transmitted optical beam can be compared to the first power level to determine the level of transmittance at that center wavelength. Next, the beam generator 78 can generate a second calibration optical beam having a second wavelength and a second power level and the process is repeated. This process can be repeated until the positions of the passbands are determined. For example, the process can be repeated for between approximately 20 to 100 different wavelengths. However, the process can include less than 20 or more than 100 different wavelengths.

The information from calibration can be stored in a look-up table that is stored in the control system 22. Additionally, using the information obtained from the calibrated optical beams, the position of other center wavelengths (not located with the calibrated optical beams) can be calculated using interpolation techniques. After calibration, analysis of the optical beam 18 can be performed.

It should be noted that in FIG. 1, that the calibration system 70 is illustrated as part of the optical analyzer 14. However, the calibration system 70 can be separate from the optical analyzer 14. For example, the calibration system 70 can be used during initial manufacture of the optical analyzer 14 to calibrate the optical analyzer 14.

Additionally, in one embodiment, the optical analyzer 14 can include a power measurer 74 that measures the total input power to the analyzer as a reference. In one embodiment, the power measurer 74 includes a photodiode.

Figure 5:
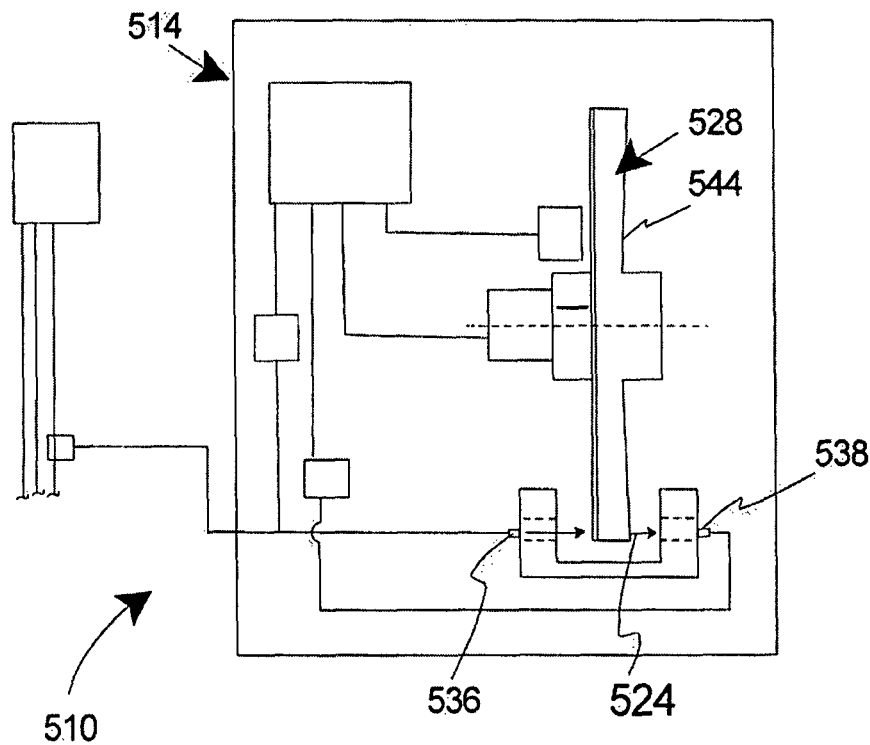
FIGS. 5, 6, 7, 8 and 9 are simplified illustrations of alternative embodiments of a precision apparatus.

FIG. 5 is a simplified illustration of still another embodiment of a precision apparatus 510 that is similar to the precision apparatus 10 described above. However, in this embodiment, the optical analyzer 514 does not include the beam redirector 40 (illustrated in FIG. 1) and the optical receiver 538 is positioned on the opposite side of the optical filter 528 from the optical launcher 536. In this embodiment, the optical analyzer 514 is a single pass system, with the transmitted optical beam 524 passing only once through the optical filter 528.

In FIG. 5, the second filter side 544 is tapered. In this embodiment, the thickness of the optical filter 528 increases with movement from near the center axis towards the outer circumference. Alternatively, the thickness of the optical filter 528 can decrease with movement from near the center axis towards the outer circumference second filter side 544.

Figure 6:
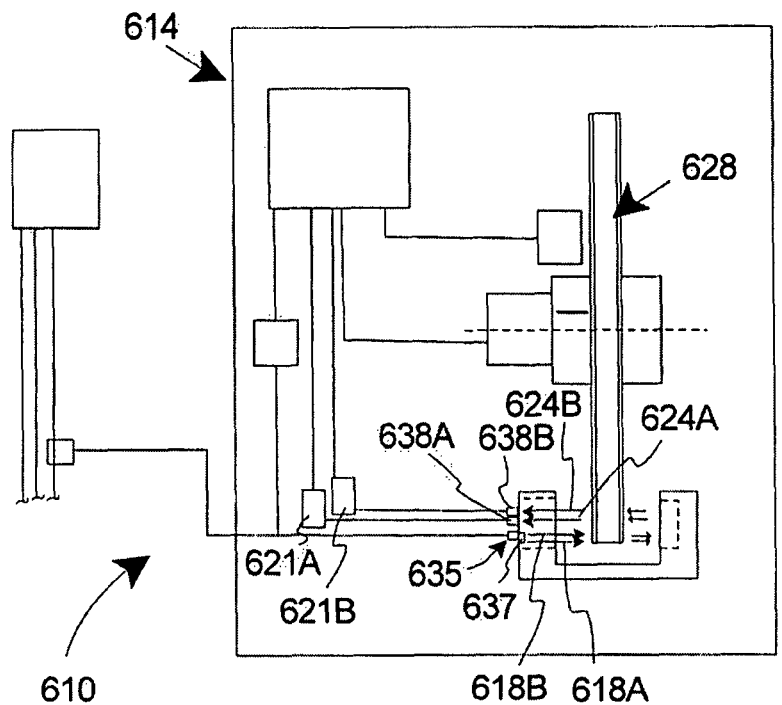

FIG. 6 is a simplified illustration of still another embodiment of a precision apparatus 610 that is similar to the precision apparatus 10 described above. However, in this embodiment, the optical launcher assembly 635 includes a beam splitter 637 that splits the optical beam (not shown) into a first optical beam 618A and a second optical beam 618B that are simultaneously directed at the spaced apart locations of the same optical filter 628. In this embodiment, the optical analyzer 614 also includes (i) a first optical receiver 638A that receives the first transmitted optical beam 624A, (ii) a first beam detector 621A that measures the magnitude of the first transmitted optical beam 624A, (iii) a second optical receiver 638B that receives the second transmitted optical beam 624B, and (iv) a second beam detector 621B that measures the magnitude of the second transmitted optical beam 624B.

With this design, the optical signals are split into two paths and applied to two parts of the optical filter 628 simultaneously. This can help deconvolve multiple input signals. It should be noted that the optical signals can be split into more than two paths with more than two optical beams being simultaneously directed at the optical filter 628.

Figure 7:
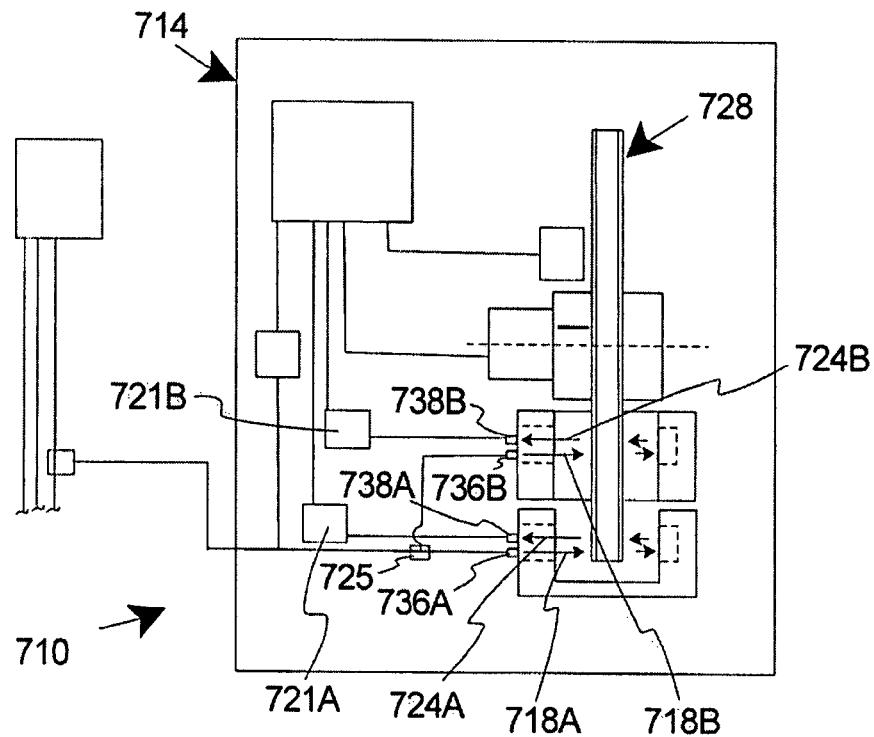

FIG. 7 is a simplified illustration of still another embodiment of a precision apparatus 710 that is similar to the precision apparatus 10 described above. However, in this embodiment, the optical signals from the same optical fiber 728 are split with a fiber coupler 725 and are simultaneously directed at the spaced apart locations of the same optical filter 728. In this embodiment, the optical analyzer 714 includes (i) a first optical launcher 736A that directs a first optical beam 718A at the optical filter 728, (ii) a first optical receiver 738A that receives the first transmitted optical beam 724A, (iii) a first beam detector 721A that measures the magnitude of the first transmitted optical beam 724A, (iv) a second optical launcher 736B that directs a second optical beam 718B at the optical filter 728, (v) a second optical receiver 738B that receives the second transmitted optical beam 724B, and (vi) a second beam detector 721B that measures the magnitude of the second transmitted optical beam 724B.

With this design, the optical signals are again split into two paths and applied to two parts of the optical filter 728 simultaneously. This can help deconvolve multiple input signals.

Figure 8:
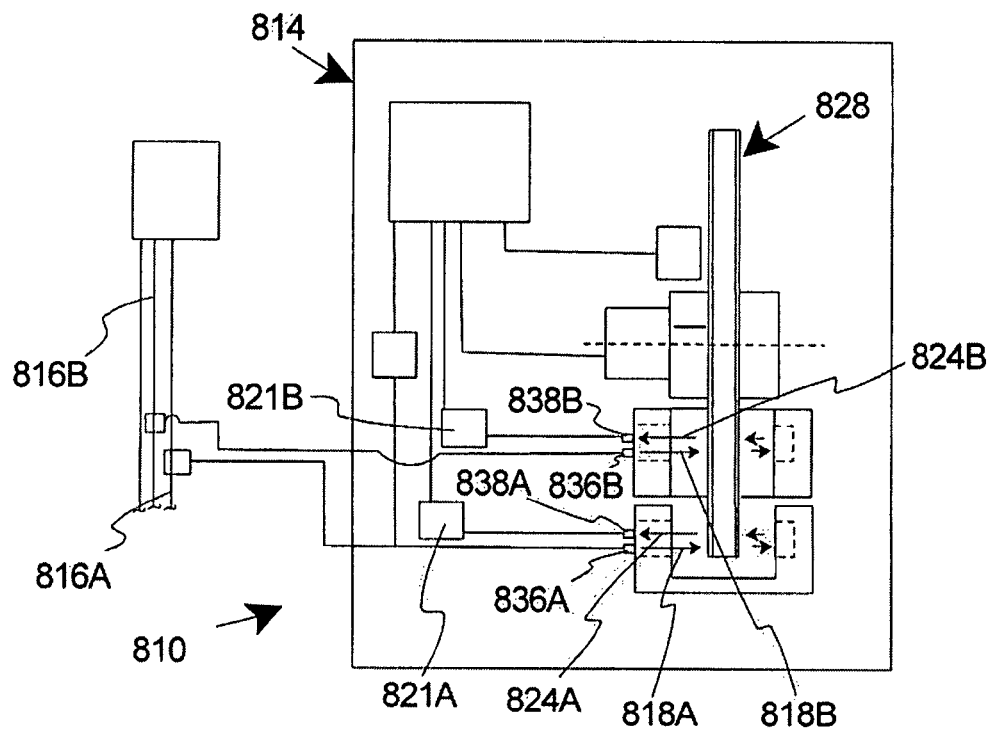

FIG. 8 is a simplified illustration of yet another embodiment of a precision apparatus 810 that is similar to the precision apparatus 710 described above. However, in this embodiment, a first optical beam 818A from a first optical fiber 816A and a second optical beam 818B from a second optical fiber 816B are simultaneously directed at the spaced apart locations to the same optical filter 828. In this embodiment, the optical analyzer 814 includes (i) a first optical launcher 836A that directs the first optical beam 818A at the optical filter 828, (ii) a first optical receiver 838A that receives the first transmitted optical beam 824A, (iii) a first beam detector 821A that measures the magnitude of the first transmitted optical beam 824A, (iv) a second optical launcher 836B that directs the second optical beam 818B at the optical filter 828, (v) a second optical receiver 838B that receives the second transmitted optical beam 824B, and (vi) a second beam detector 821B that measures the magnitude of the second transmitted optical beam 824B.

With this design, two separate optical beams 818A, 818B can be analyzed simultaneously using many of the same components, without a significant increase in the number of parts. It should be noted that more than two optical beams 818A, 818B can be simultaneously directed at the optical filter 828. With this design, the system is readily expandable.

Figure 9:
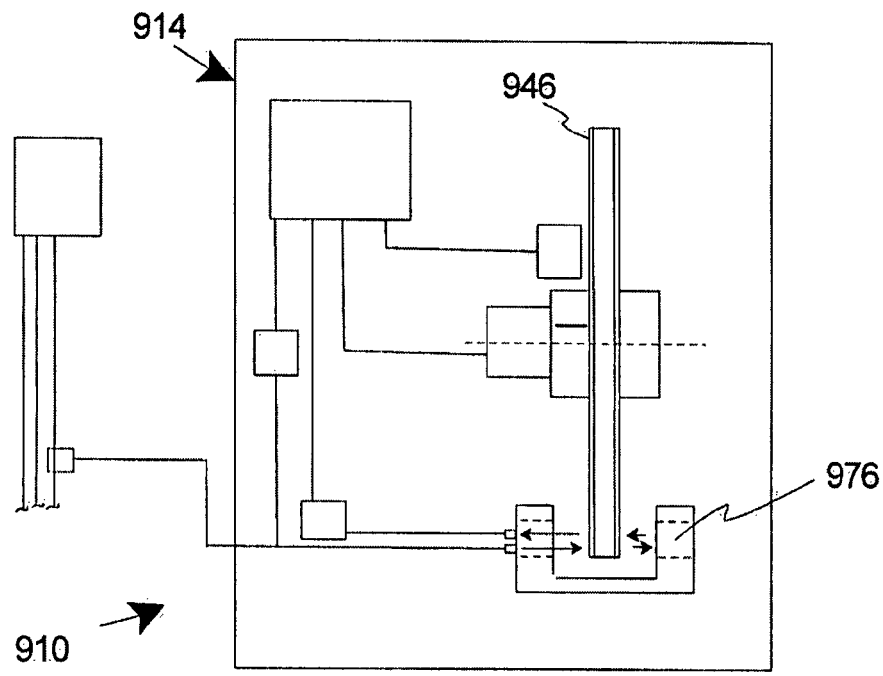

FIG. 9 is a simplified illustration of still another embodiment of a precision apparatus 910 that is similar to the precision apparatus 10 described above. However, in this embodiment, the beam redirector 40 (illustrated in FIG. 1) has been replaced with a very narrow band additional filter 976 having a passband that is just outside the monitored band. For instance, if the optical analyzer 914 is set up to monitor the C band from 1525 to 1575 nanometer, the additional filter 976 could be made to transmit at 1523 nanometer, for example. With this design, the optical analyzer 914 would include a reference channel because the beam detector 921 would receive no signal when both the additional filter 976 and the center wavelength of the filter area 946 are aligned at 1520 nanometer. This eliminates the need for an additional wavelength reference.

It is also possible that the additional filter 976 can be temperature insensitive etalon with the free spectral range (FSR) set such that there are two peaks in transmission. For example, one peak could be at 1523 nanometer and the other peak could be at 1577 nanometer. This gives a reference at both ends.

It should be noted that in analyzers 514-914 illustrated in FIGS. 5-9, the optical beams can be directed at near normal incidence to the optical filter.

Figure 10:
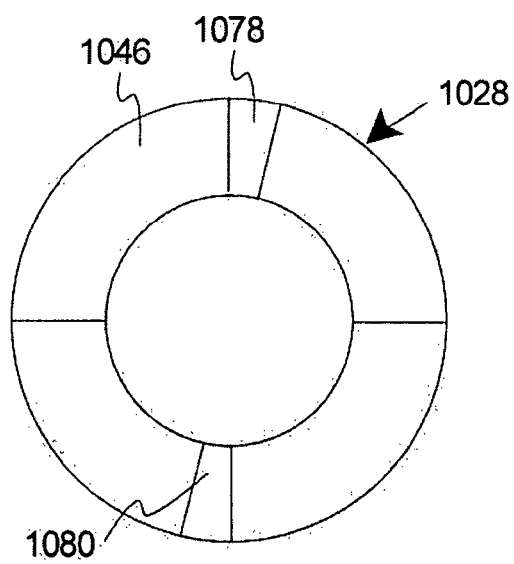
FIGS. 10 and 11 are plan views of alternative optical filters having features of the present invention.

FIG. 10 is a plan view of another embodiment of an optical filter 1028 that is somewhat similar to the optical filter 28 described above. However, in this embodiment, the filter area 1046 includes a full transmittance region 1078 that allows for the transmission of all wavelengths or a certain range of wavelengths, and a full block region 1080 that blocks all wavelengths or blocks a certain range of wavelengths. With this design, the full transmittance region 1078 and the full block region 1080 can be used during calibration of the optical analyzer 14 (illustrated in FIG. 1).

Figure 11:
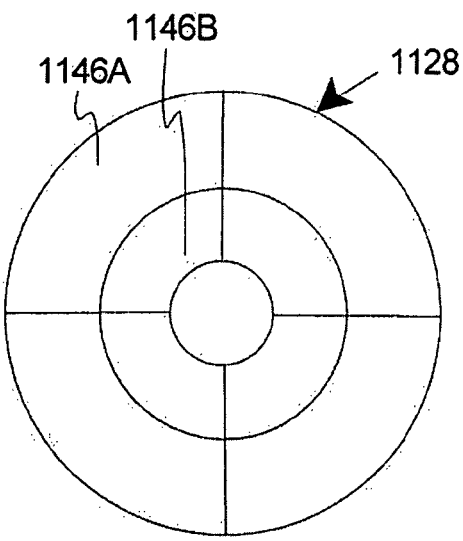

FIG. 11 is a plan view of yet another embodiment of an optical filter 1128 that is somewhat similar to the optical filter 28 described above. However, in this embodiment, the optical filter 1128 includes a first filter area 1146A and a second filter area 1146B. In one embodiment, the filter areas 1146A, 1146B are concentric and each is shaped similar to an annular disk. Additionally, the first filter area 1146A can have a center wavelength that varies over a first center wavelength range and the second filter area 1146B can have a center wavelength that varies over a second center wavelength range that is different than the first center wavelength range. In this embodiment, the first optical launcher (not shown in FIG. 11) can direct the first optical beam (not shown in FIG. 11) at the first filter area 1146A, and the second optical launcher (not shown in FIG. 11) can direct the second optical beam (not shown in FIG. 11) at the second filter area 1146B. With this design, the same optical filter 1128 can be used to test multiple optical beams with different wavelengths.

In one non-exclusive example, the first center wavelength range is approximately 1526 to 1575 nanometers to test the C band, and the second center wavelength range is approximately 1571 to 1610 nanometers to test the L band.

It should be noted that in the embodiments illustrated in FIGS. 10 and 11, the respective optical beam (not shown in FIGS. 10 and 11) can be directed at the respective filter areas at near normal incidence.

Figure 12:
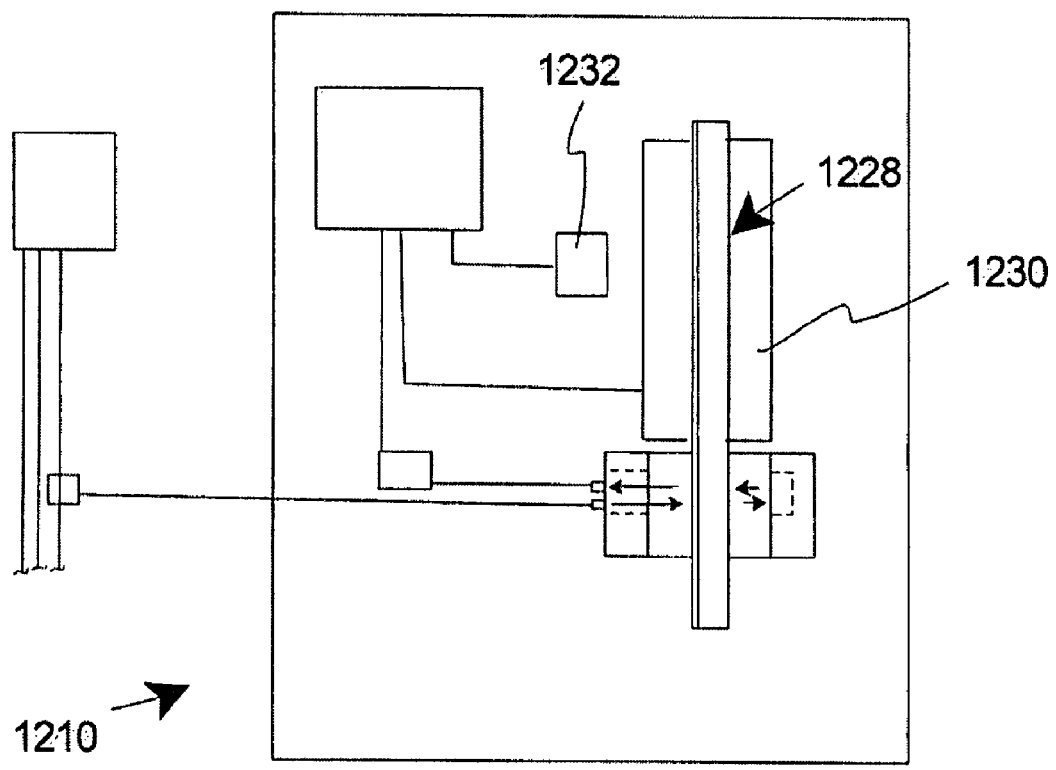
FIG. 12 is simplified illustration of an additional alternative embodiment of a precision apparatus.

FIG. 12 is a simplified illustration of yet another embodiment of a precision apparatus 1210 that is similar to the precision apparatus 10 described above. However, the optical filter 1228 is generally linear and the mover 1230 is a linear mover that moves the optical filter 1228 back and forth linearly. In this embodiment, the position sensor 1232 monitors the linear position and movement rate of the optical filter 1228.

Figure 13:
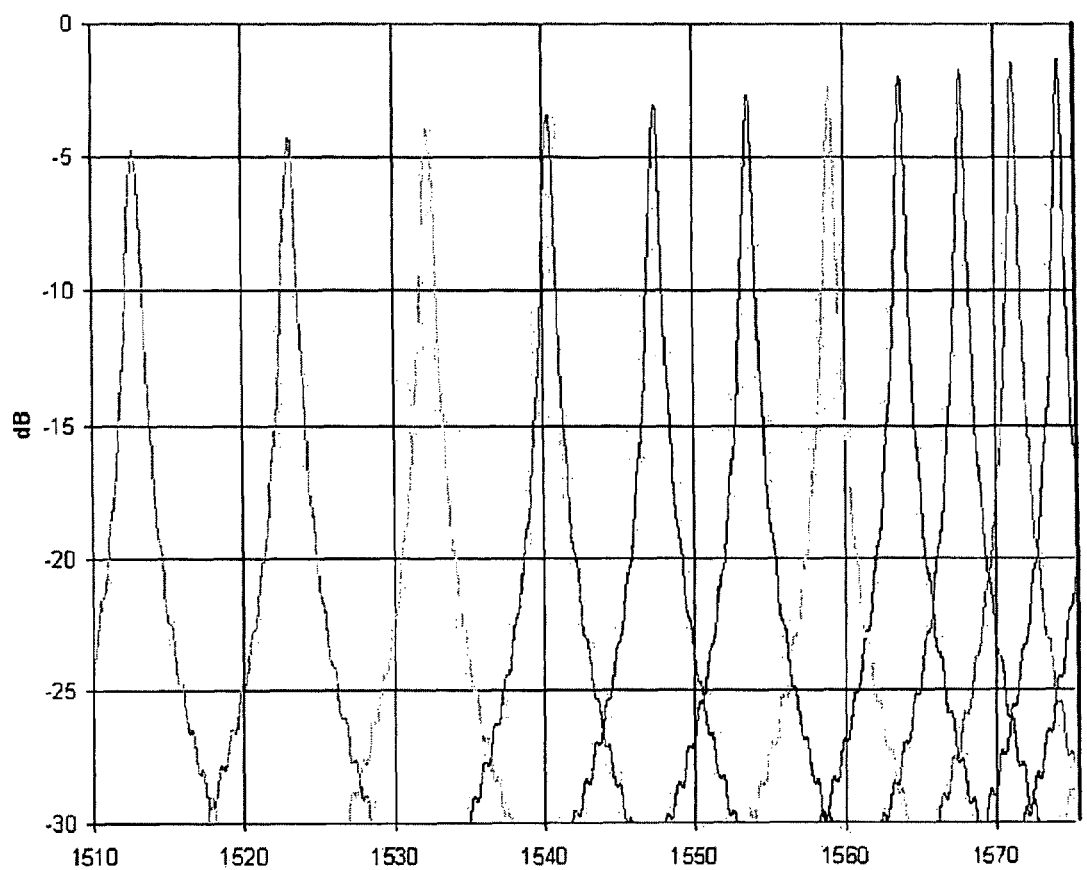
FIG. 13 is a graph that illustrates the alternative center wavelengths of one embodiment of an optical filter having features of the present invention.

FIG. 13 is a graph that illustrates the alternative center wavelengths of one embodiment of an optical filter having features of the present invention. It should be noted that only a few of the center wavelengths of the optical filter are illustrated in FIG. 13. Additionally, FIG. 13 illustrates that (i) the optical filter includes multiple different center wavelengths, (ii) the optical filter includes a plurality of relatively steep spherical slopes, and (iii) the optical filter is a narrow band pass filter having a relatively narrow bandwidth. It should be noted that other optical filter designs can be utilized.

While the particular apparatus 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An analyzer for performing spectral analysis on a first optical beam from an optical communication network to determine a wavelength and a magnitude of the first optical beam, the analyzer comprising:

an optical filter having a first filter area that includes at least one relatively steep spectral slope, wherein the first filter area is a narrow band pass filter with a passband having a bandwidth of less than approximately 5 nm;

a mover that causes relative movement between the optical filter and the first optical beam;

an optical launcher assembly that directs a portion of the first optical beam from the optical communication network at the first filter area so that the first optical beam is at near approximately normal incidence to the first filter area;

a beam detector that receives the first optical beam that is transmitted through the optical filter; and a control system that determines the wavelength and power level of the first optical beam using information from the beam detector.

2. The analyzer of claim 1 wherein the mover rotates the optical filter about a filter rotational axis and the optical launcher assembly directs the first optical beam at the first filter area so that the first optical beam is substantially parallel to the filter rotational axis.

3. The analyzer of claim 1 wherein a second optical beam is directed at the optical filter so that the second optical beam is substantially normal to the optical filter.

4. The analyzer of claim 3 wherein the first optical beam and the second optical beam include the same optical signals.

5. The analyzer of claim 3 wherein the first optical beam and the second optical beam include different optical signals.

6. The analyzer of claim 1 wherein the band pass filter includes multiple, alternative center wavelengths.

7. The analyzer of claim 1 wherein the band pass filter has a center wavelength that varies along at least a portion of the filter area.

8. The analyzer of claim 1 wherein the filter area is generally annular disk shaped.

9. A precision apparatus including an optical network that carries the first optical beam, and the optical analyzer of claim 1 that spectrally analyzes the first optical beam.

10. An optical communication network for transmitting multiple optical signals using a first optical beam, the optical communication network comprising:

an optical fiber that carries at least a portion the first optical beam; and a channel monitor for performing spectral analysis on a first optical beam that is carried in the optical fiber, the channel monitor comprising:

an optical filter having a first filter area that is a band pass filter having multiple, alternative center wavelengths, wherein the band pass filter has a passband having a bandwidth of less than approximately 5 nm;

a mover that causes relative movement between the optical filter and the first optical beam; and a first optical launcher that directs a portion of the first optical beam at the first filter area.

11. The optical communication network of claim 10 wherein the mover rotates the optical filter about a filter rotational axis and the first optical launcher directs the first optical beam at the first filter area so that the first optical beam is substantially parallel to the filter rotational axis.

12. The optical communication network of claim 10 further comprising a second optical launcher that directs a second optical beam at the first filter area so that the second optical beam is substantially normal to the first filter area.

13. The optical communication network of claim 10 wherein the optical filter includes a second filter area and wherein the analyzer includes a second optical launcher that directs a portion of a second optical beam at the second filter area so that the second optical beam is substantially normal to the second filter area.

14. The optical communication network of claim 10 wherein the center wavelength value varies continuously along substantially the entire filter area.

15. The optical communication network of claim 10 wherein the filter area is generally annular disk shaped.

16. An analyzer for performing spectral analysis on a first optical beam and a second optical beam of an optical communication network, the analyzer comprising:

an optical filter including a band pass filter with a passband having a bandwidth of less than approximately 5 nm;

a mover that moves the optical filter;

a first optical launcher that directs a portion of the first optical beam at the optical filter;

a second optical launcher that directs a portion of the second optical beam at the optical filter;

a first beam detector that receives the first optical beam that is transmitted through the optical filter;

a second beam detector that receives the second optical beam that is transmitted through the optical filter; and a control system that determines (i) the wavelength and power level of the first optical beam using information from the first beam detector, and (i) the wavelength and power level of the second optical beam using information from the second beam detector.

17. The analyzer of claim 16 wherein each optical launcher directs the optical beams at the optical filter at near normal incidence to the optical filter.

18. The analyzer of claim 16 wherein the mover rotates the optical filter about a filter rotational axis and the optical launchers direct the optical beams at the optical filter so that the optical beams are substantially parallel to the filter rotational axis.

19. The analyzer of claim 16 wherein the optical filter includes a first filter area and a second filter area and wherein the first optical beam is directed at the first filter area and the second optical beam is directed at the second filter area.

20. The analyzer of claim 16 wherein the band pass filter has multiple, alternative center wavelengths.

21. A precision apparatus including an optical network that carries the first optical beam and the second optical beam, and the optical analyzer of claim 16 that spectrally analyzes the optical beams.

22. An optical filter for an analyzer that performs spectral analysis on an optical beam, the filter comprising:

a first filter segment having a first passband with a bandwidth of less than approximately 5 nm; and a second filter segment having a second passband with a bandwidth of less than approximately 5 nm, the second passband being different than the first passband, the second filter segment and the first filter segment cooperating to form at least a portion of a filter wheel.

23. The optical filter of claim 22 wherein each filter segment is generally arch shaped.

24. The optical filter of claim 22 wherein each filter segment includes multiple, alternative center wavelengths.

25. The optical filter of claim 22 wherein each filter segment is cut from a wafer having multiple, alternative center wavelengths.

26. The optical filter of claim 22 further comprising a third filter segment that includes at least one relatively steep spectral slope, and a fourth filter segment that includes at least one relatively steep spectral slope, the filter segments cooperating to form at least a portion of the filter wheel.

27. An analyzer for performing spectral analysis on an optical beam, the analyzer comprising the optical filter of claim 22, a mover that causes relative movement between the optical filter and the optical beam, and an optical launcher assembly that directs the optical beam at the optical filter.

28. A precision apparatus including an optical network that carries the optical beam, and the optical analyzer of claim 27 that spectrally analyzes the optical beam.

29. An analyzer for performing spectral analysis on an optical beam, the analyzer comprising:
- an optical filter including a narrow band pass filter with a passband having a bandwidth of less than approximately 5 nm;
- a mover that causes relative movement between the optical filter and the optical beam; and
- an optical launcher that directs a portion of the optical beam at optical filter.

30. The analyzer of claim 29 wherein the mover rotates the optical filter about a filter rotational axis and the first optical launcher directs the optical beam at the optical filter so that the optical beam is substantially parallel to the filter rotational axis.

31. The analyzer of claim 29 wherein the narrow band pass filter has a passband with a bandwidth of less than approximately 1 nm.

32. The analyzer of claim 29 wherein the narrow band pass filter has passband with a bandwidth of less than approximately 0.5 nm.

33. The analyzer of claim 29 wherein the filter includes at least one steep spectral slope.

34. The analyzer of claim 29 wherein the band pass filter includes multiple, alternative center wavelengths.

35. A precision apparatus including an optical network that carries the first optical beam, and the optical analyzer of claim 29 that spectrally analyzes the first optical beam.

36. An analyzer for performing spectral analysis on a first optical beam, the analyzer comprising:
- an optical filter having a first filter area that includes at least one relatively steep spectral slope;
- a mover that causes relative movement between the optical filter and the first optical beam;
- an optical launcher assembly that directs a portion of the first optical beam at the first filter area so that the first optical beam is at near normal incidence to the first filter area; and
- an optical redirector that redirects the first optical beam that passes through the optical filter back at the optical filter.

37. An analyzer for performing spectral analysis on a first optical beam, the analyzer comprising:
- an optical filter having a first filter area that is a band pass filter having multiple, alternative center wavelenghts;
- a mover that causes relative movement between the optical filter and the first optical beam;
- a first optical launcher that directs a portion of the first optical beam at the first filter area; and
- an optical redirector that redirects the first optical beam that passes through the optical filter back at the optical filter.

38. An analyzer for performing spectral analysis on a first optical beam and a second optical beam, the analyzer comprising:
- an optical filter is a band pass filter having a center wavelength value that varies along substantially the entire filter area;
- a mover that moves the optical filter;
- a first optical launcher that directs a portion of the first optical beam at the optical filter; and
- a second optical launcher that directs a portion of the second optical beam at the optical filter.

39. An optical filter for an analyzer that performs spectral analysis on an optical beam, the filter comprising:
- a first filter segment that includes at least one relatively steep spectral slope; and
- a second filter segment including at least one relatively steep spectral slope, the second filter segment and the first filter segment cooperating to form at least a portion of a filter wheel;
- wherein each filter segment includes multiple, alternative center wavelengths, and wherein for each filter segment, the center wavelength varies substantially linearly along a line that is substantially tangential to a center axis of the filter.

* * * * *